(12) United States Patent  (10) Patent No.: US 8,521,429 B2
Sundararajan et al.  (45) Date of Patent: Aug. 27, 2013

(54) ACCURACY ASSESSMENT FOR LOCATION ESTIMATION SYSTEMS

(75) Inventors: Arjun Sundararajan, Bellevue, WA (US); Michael Barto, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 12/485,951

(22) Filed: Jun. 17, 2009

(65) Prior Publication Data

US 2010/0324813 A1  Dec. 23, 2010

(51) Int. Cl.
*G08G 1/123* (2006.01)

(52) U.S. Cl.
USPC ........... 701/532; 455/115.1; 455/414.2; 455/456.1; 455/456.2; 455/457; 342/450; 342/451

(58) Field of Classification Search
USPC ............ 701/208, 532; 455/115.1, 115.3, 455/226.2, 404.2, 414.2, 456.1, 456.2, 457; 342/357, 385, 420, 446, 450, 451
See application file for complete search history.

(56) References Cited

U.S. PATENT DOCUMENTS

| | | | | |
|---|---|---|---|---|
| 6,801,782 | B2 * | 10/2004 | McCrady et al. | 455/517 |
| 7,257,411 | B2 | 8/2007 | Gwon et al. | |
| 7,395,073 | B2 * | 7/2008 | Gwon et al. | 455/456.1 |
| 7,720,487 | B2 * | 5/2010 | Kim et al. | 455/456.1 |
| 7,812,766 | B2 * | 10/2010 | Leblanc et al. | 342/457 |
| 8,031,657 | B2 * | 10/2011 | Jones et al. | 370/328 |
| 2002/0196188 | A1 * | 12/2002 | Holt | 342/453 |
| 2003/0054813 | A1 * | 3/2003 | Riley et al. | 455/424 |
| 2003/0087647 | A1 * | 5/2003 | Hurst | 455/456 |
| 2004/0075606 | A1 * | 4/2004 | Laiho et al. | 342/357.1 |
| 2004/0198386 | A1 * | 10/2004 | Dupray | 455/456.1 |
| 2004/0203904 | A1 * | 10/2004 | Gwon et al. | 455/456.1 |
| 2004/0248589 | A1 * | 12/2004 | Gwon et al. | 455/456.1 |
| 2007/0155489 | A1 * | 7/2007 | Beckley et al. | 463/29 |
| 2008/0032705 | A1 * | 2/2008 | Patel et al. | 455/456.1 |
| 2008/0055158 | A1 * | 3/2008 | Smith et al. | 342/464 |
| 2008/0133126 | A1 * | 6/2008 | Dupray | 701/204 |
| 2008/0176583 | A1 * | 7/2008 | Brachet et al. | 455/456.3 |
| 2008/0261623 | A1 | 10/2008 | Etemad et al. | |

(Continued)

OTHER PUBLICATIONS

Kan, et al., "A Dual-Channel Location Estimation System for Providing Location Services based on the GPS and GSM Networks", Retrieved at <<http://ieeexplore.ieee.org/stamp/stamp.jsp?tp=&arnumber=1192836&isnumber=26745>>, Proceedings of the 17th International Conference on Advanced Information Networking and Applications (AINA'03), 2003, IEEE, Mar. 27-29, 2003, pp. 6.

(Continued)

*Primary Examiner* — Khoi Tran
*Assistant Examiner* — Jamie Figueroa

(57) ABSTRACT

Assessing the accuracy of location estimation systems. A mobile computing device provides location information including a device location (e.g., via GPS) and one or more wireless network beacons accessible by the computing device at the device location. The wireless network beacons accessible by the computing device are compared to stored post information including a plurality of beacon lists. An estimated device location is determined based on the comparison. The estimated device location is compared to the known device location. A difference between the estimated device location and the received device location is determined based on the comparison. An analysis of the determined difference is performed to generate accuracy maps and other insight into the relationship between accuracy and geographic area for the location estimation systems.

20 Claims, 6 Drawing Sheets

(56) References Cited

U.S. PATENT DOCUMENTS

| | | | |
|---|---|---|---|
| 2009/0005061 A1* | 1/2009 | Ward et al. | 455/456.1 |
| 2009/0005975 A1 | 1/2009 | Forstall et al. | |
| 2009/0046013 A1 | 2/2009 | Yanagihara | |
| 2010/0222081 A1* | 9/2010 | Ward et al. | 455/456.3 |

OTHER PUBLICATIONS

Turkyilmaz, et al., "Environment Aware Location Estimation in Cellular Networks", Retrieved at <<http://www.hindawi.com/journals/asp/2008/276456.pdf>>, Hindawi Publishing Corporation, EURASIP Journal on Advances in Signal Processing, vol. 2008, Mar. 23, 2007, pp. 13.

Sheu, et al., "A Distributed Location Estimating Algorithm for Wireless Sensor Networks", Retrieved at <<http://ieeexplore.ieee.org/stamp/stamp.jsp?arnumber=01636179>>, Proceedings of the IEEE International Conference on Sensor Networks, Ubiquitous, and Trustworthy Computing (SUTC'06), 2006, IEEE Jun. 5-7, 2006, pp. 8.

Kitasuka, et al., "Location Estimation System using Wireless Ad-Hoc Network", Retrieved at <<http://www.f.csce.kyushu-u.ac.jp/~kitasuka/papers/2002/wpmc02_kitasuka_pub.pdf>>, Proceedings of the 5th International Symposium on Wireless Personal Multimedia Communications, WPMC 2002, Oct. 29, 2002, pp. 5.

Cope, et al., "Investigations in Location Aware Wireless Infrastructure", Retrieved at <<http://www.ja.net/documents/development/network-access/location-awareness/location-awareness-draft.pdf>>, JANET Network Access Programme, Mar. 2009, pp. 104.

\* cited by examiner

ACCURACY ASSESSMENT FOR LOCATION ESTIMATION SYSTEMS

BACKGROUND

Location estimation or detection services provide location information to requesting computing devices. For example, applications executing on a mobile computing device such as a mobile telephone may request the location information to provide navigation services to a user, or display a map to the user of the current location. The accuracy of the estimated location, however, varies based on the particular location estimation service accessed, the geographic area of the mobile telephone, and other factors. For example, some services may consistently provide estimated locations with a high degree of accuracy for a particular geographic area and a low degree of accuracy in another geographic area.

To determine accuracy in existing systems, a test unit or device is placed in a known location, and a request is made to an existing location estimation service. The returned estimated location is compared to the known location to determine the accuracy of the estimation location. Such existing systems, however, are not scalable and fail to provide continual monitoring. For example, to determine the accuracy across numerous areas, the test has to be manually re-performed in each of the areas.

Other systems for testing accuracy rely on user feedback. For each estimated location provided to a user, the user opts to report the perceived degree of accuracy of the estimated location relative to the actual location of the mobile device. This reported accuracy, however, is subjective. Such existing systems lack granularity and accountability, and fail to provide objective output. Additionally, there is little incentive for users to provide feedback.

SUMMARY

Embodiments of the invention assess the accuracy of location estimation systems. Location information is received from a computing device. The location information includes a device location associated with the computing device and further identifies one or more wireless network beacons accessible by the computing device at the device location. Post information including a plurality of locations each having a list of wireless network beacons accessible therefrom is maintained. The identified wireless network beacons accessible by the computing device are compared to the maintained post information to determine an estimated device location. The estimated device location is compared to the received device location. A difference between the estimated device location and the received device location is determined based on the comparison. The maintained post information is modified based on the determined difference.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
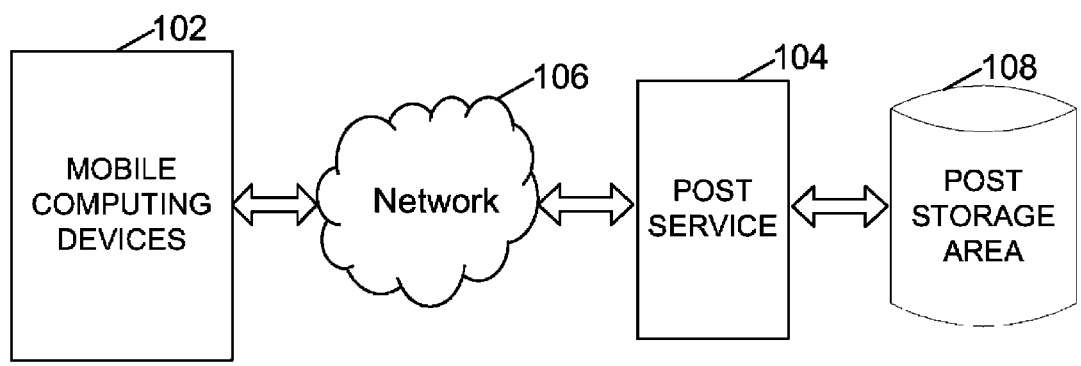
FIG. 1 is an exemplary block diagram illustrating mobile computing devices providing post information to a post service for storage.

Referring to the figures, embodiments of the disclosure enable, at least, determination of the accuracy of estimated locations for computing devices provided by location estimation systems. In some embodiments, continuous assessment of the correctness of the estimated locations is provided, along with the large-scale generation of ground truth locations to provide sample data for determined the accuracy (e.g., see FIG. 1).

Referring again to FIG. 1, an exemplary block diagram illustrates mobile computing devices 102 providing post information 308 to a post service 104 (e.g., a web service) for storage. The mobile computing devices 102 communicate with the post service 104 via a network 106. For example, the network 106 includes any wired or wireless network including, but not limited to, cellular networks and BLUETOOTH brand wireless networks. The mobile computing devices 102 provide data to the post service 104 for storage in a post storage area 108. The post storage area 108 includes any memory area internal to, external to, or accessible by the post service 104. For example, the post storage area 108 includes a remote database or storage provided by a cloud storage service.

Figure 2:
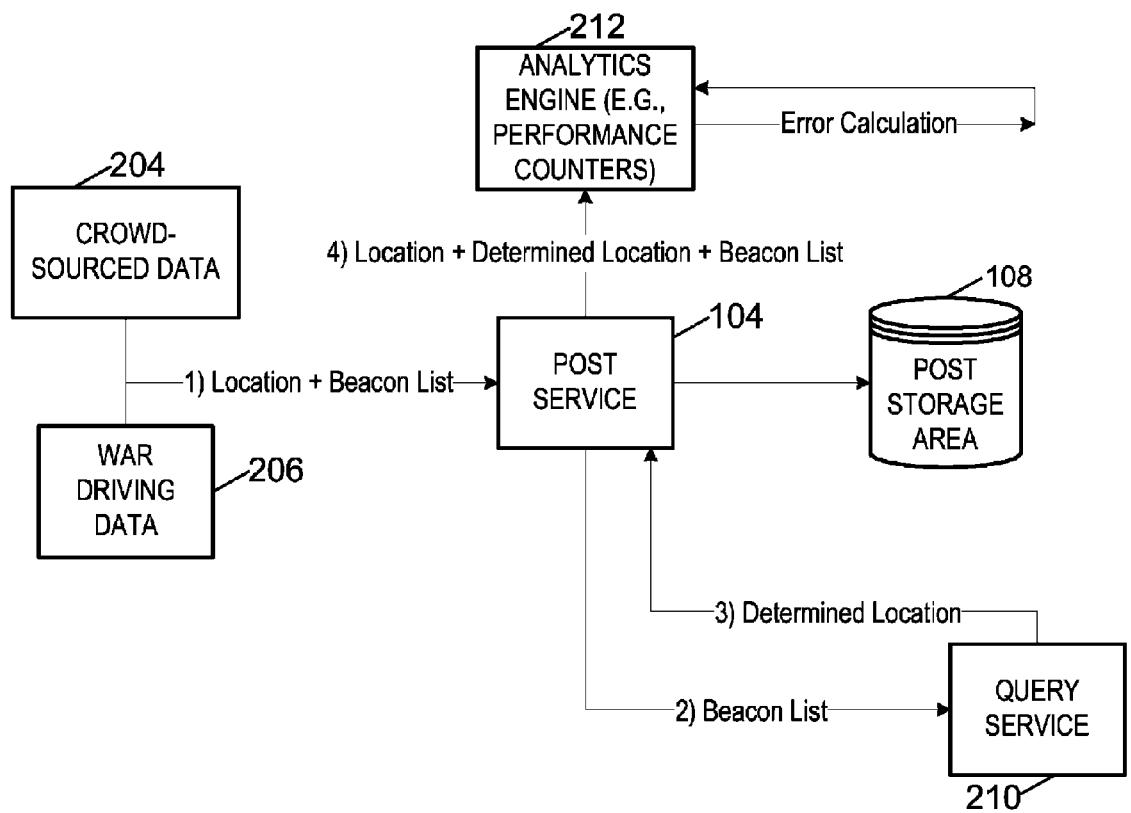
FIG. 2 is an exemplary block diagram illustrating a post service interacting with a query service to estimate a device location and determine an accuracy of the estimation.

Referring next to FIG. 2, an exemplary block diagram illustrates the post service 104 interacting with a query service 210 to estimate a device location and determine an accuracy of the estimation. The post service 104 and the query service 210, in conjunction with the other components in FIG. 2, act as a location estimation or detection system. The post service 104 receives the post information 308 from one or more computing devices. The post information 308 includes, at least, "war driving data" 206 and/or "crowd-sourced data" 204. The war driving data 206 includes data from mobile computing devices 102 that travel around various geographic areas collecting information about accessible wireless network beacons. For example, the mobile computing devices 102 report the wireless network beacons that are visible at particular locations around a geographic area. The reports are generated at various times, including fixed time intervals or distances.

The crowd-sourced data 204 includes data from computing devices that request location estimation or detection information from the location estimation system. With the war driving data 206, crowd-sourced data 204, or other data, the post information 308 from one of the computing devices includes a location of the computing device along with a list of wireless network beacons (e.g., a beacon list) accessible by the computing device from the location. The location of the computing device is determined by the computing device via any means for determining such a location. For example, the computing device may determine its position via a global positioning system (GPS).

The post service 104 stores the received post information 308 in a memory area such as the post storage area 108 as shown in FIG. 1 and FIG. 2.

The post service 104 receives requests for location estimation (e.g., as part of the crowd-sourced data 204). Responsive to the received requests, the post service 104 communicates with the query service 210 to estimate the location of the requesting computing device. The post service 104 provides the query service 210 with a beacon list from the received request. The query service 210 includes any service, component, module, or the like that determines a location based on the beacon list received from the post service 104. The query service 210 may execute on the same computing device as the post service 104, or may execute remotely from the post service 104 (e.g., accessible via a network such as the Internet). The query service 210 returns the determined location of the requesting computing device to the post service 104. The post service 104 provides the determined location to the requesting computing device.

Additionally, in conjunction with aspects of the disclosure, the post service 104 provides the estimated location of the computing device along with the known location of the computing device (e.g., as received in the request received from the computing device) to an analytics engine 212 or other computing device or component. The analytics engine 212 performs various statistical computations, performance calculations, and other operations to compare the estimated location of the computing device with the known location of the computing device. In some embodiments, such as shown in FIG. 2, the post service 104 also provides the beacon list from the request to the analytics engine 212.

The analytics engine 212 performs various computations such as error calculations to determine the accuracy of the estimated location with respect to the actual known location of the computing device. For example, one or more of the following calculations may be performed: average radius, error distance, request hit (e.g., quantity of requests in which the known location was inside the error radius), request success (e.g., quantity of requests for which the location estimation service returned a response), request timed out (e.g., quantity of requests that timed out), request total (e.g., total quantity of received requests for location information), and response latency (e.g., average latency for a request).

Alternatively or in addition, other calculations performed by the analytics engine 212 are within the scope of the disclosure. For example, one or more of the following may be determined or derived from the aspects of the disclosure: correctness per area (e.g., city/county/state), correctness per beacon (e.g., per cell tower or wireless access point), and correctness per mobile network provider). Any of the calculations described herein may be scheduled to perform automatically on a recurring basis. The requests for location information may be stored as a static test suite to be run on demand or periodically to measure or gauge improvements in accuracy.

Figure 4:
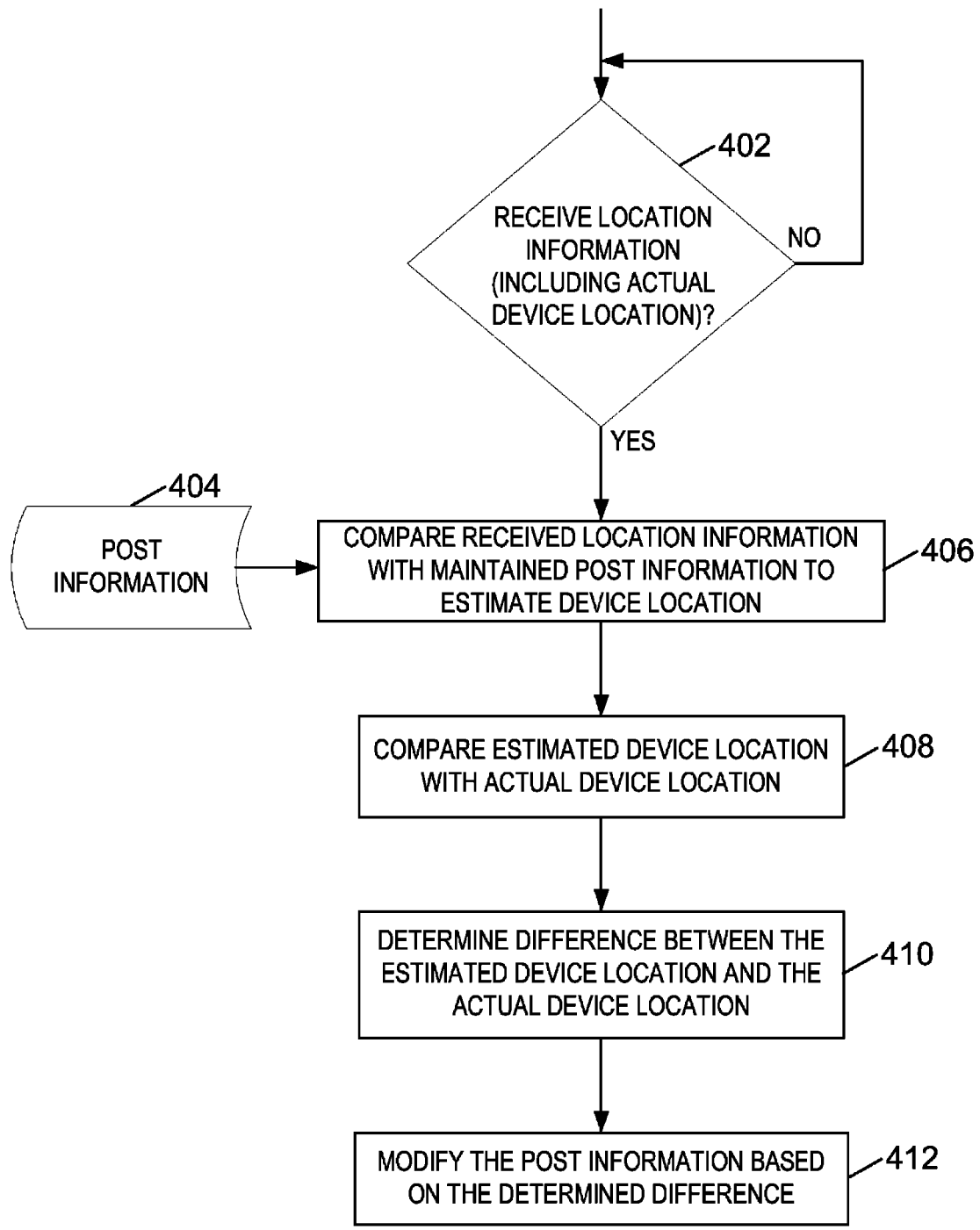
FIG. 4 is an exemplary flow chart illustrating device location estimation using stored post information.

Based on the determined accuracy, the location estimation system may adjust various parameters or operations of the location estimation system, and/or modify the data stored in the post storage area 108 (e.g., see description associated with FIG. 4).

The post service 104 may communicate with the analytics engine 212 in real-time or near real-time after receiving the request from the computing device (e.g., part of the crowd-sourced data 204), or the post service 104 may batch, queue, or otherwise delay the communication with the analytics engine 212 until a later time for processing. For example, the post service 104 may postpone use of the analytics engine 212 until off-peak hours or other times when network usage is reduced. At that time, the analytics engine 212 performs various computations over a set of data points, where each of the data points includes the known location of the computing device, the determined location of the computing device, and the beacon list.

Figure 3:
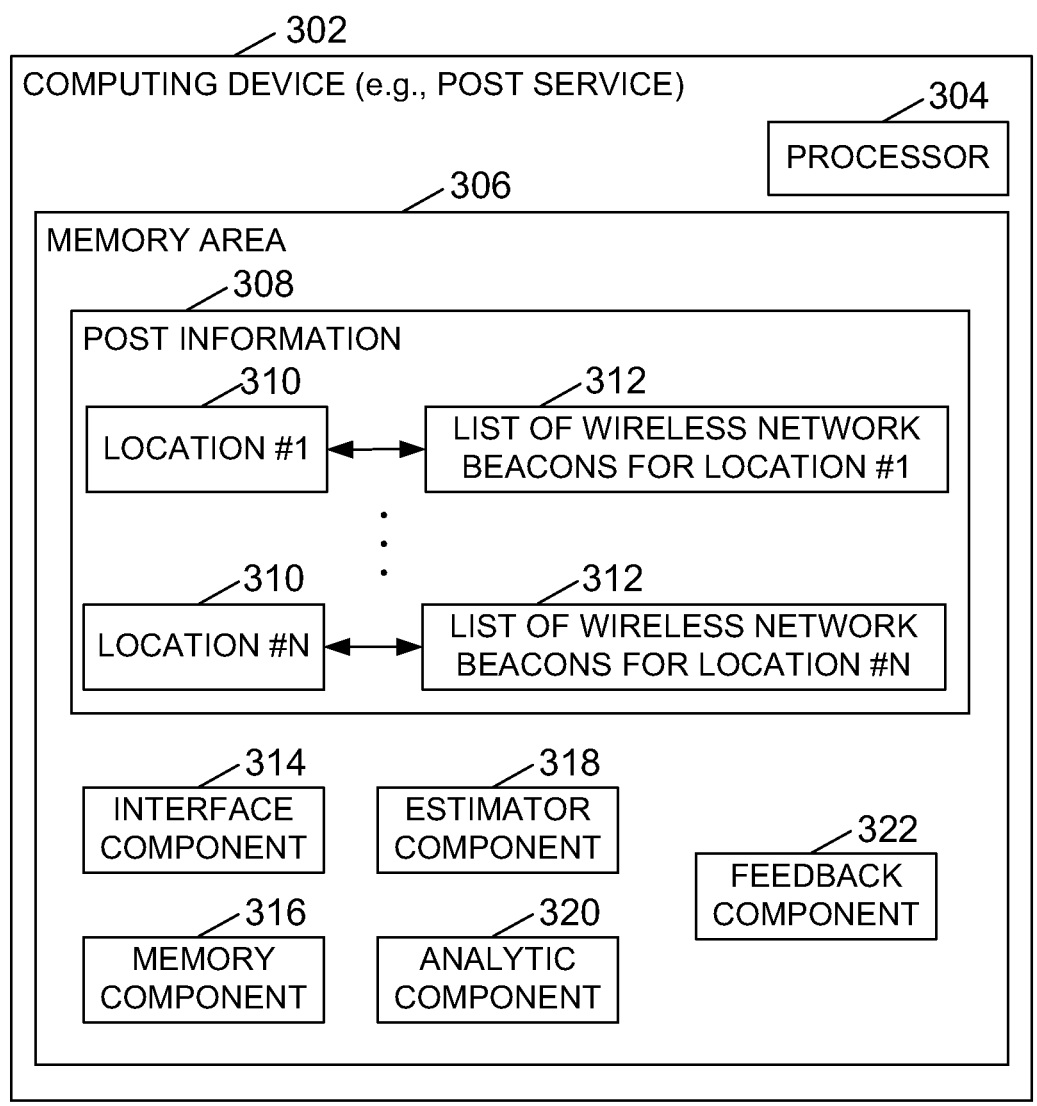
FIG. 3 is an exemplary block diagram illustrating a computing device for implementing the post service.

Referring next to FIG. 3, an exemplary block diagram illustrates a computing device 302 for implementing the post service 104. The computing device 302 includes at least a memory area 306, the display, and a processor 304. The memory area 306, or other computer-readable media, stores the post information 308 including a plurality of locations 310 such as location #1 through location #N. Each of the locations has a list of wireless network beacons 312 associated therewith. The list of wireless network beacons 312 for one of the locations 310 represents the beacons accessible from that location. The beacons include, for example, cellular network towers, routers, wireless access points, network access points, and the like. In some embodiments, the locations 310 include both the locations received from the computing device in location requests and previously estimated locations or other calculated locations.

The memory area 306, or one or more computer-readable media, further stores computer-executable components for implementing aspects of the disclosure. Exemplary components include an interface component 314, a memory component 316, an estimator component 318, an analytic component 320, and a feedback component 322. These components are described below with reference to FIG. 4.

In general, the memory area 306 is associated with the computing device 302. For example, in FIG. 3, the memory area 306 is within the computing device 302. However, the memory area 306 or any of the data stored thereon may be associated with any server or other computer, local or remote from the computing device 302 (e.g., accessible via a network). For example, as in FIG. 2, the memory area 306 (e.g., the post storage area 108) is external to the computing device 302.

The processor 304 includes any quantity of processing units, and is programmed to execute computer-executable instructions for implementing aspects of the disclosure. The instructions may be performed by the processor 304 or by multiple processors executing within the computing device 302, or performed by a processor external to the computing device 302 (e.g., by a cloud service). In some embodiments, the processor 304 is programmed to execute instructions such as those illustrated in the figures (e.g., FIG. 4).

Embodiments of the invention are operable with the computing device 302 being any device or combination of devices. For example, aspects of the invention are operable with the computing device 302 being one or more of the following: digital camera, digital video camera, netbook, laptop computer, gaming console (including handheld gaming console), portable music player, personal digital assistant, information appliance, and personal communicator. For example, computing device 302 represents a device that receives data from a plurality of the mobile computing devices 102 and communicates the received data to the post service 104.

Referring next to FIG. 4, an exemplary flow chart illustrates device location estimation using stored post information 308. If location information is received from one of the mobile computing devices 102 at 402, the received location information is compared at 406 with the post information 308 maintained at 404 to estimate the device location. The location information includes the actual device location (e.g., as determined by a GPS system).

Aspects of the disclosure contemplate various ways to compare the location information with the maintained post information 308. In some embodiments, the maintained post information 308 (e.g., beacon lists associated with locations 310) is searched to find a match with the list of wireless network beacons 312 from the received location information. The search may be performed by any means for comparing lists. A match is found when one of the beacon lists in the post information 308 has a pre-defined threshold quantity of the beacons common to the list of wireless network beacons 312 from the location information. For example, if there is a list of beacons in the post information 308 that matches exactly the list of wireless network beacons 312 from the received location information, that list of beacons is selected. Alternatively, if there is 80% match or other pre-defined threshold percentage, that list of beacons is selected. Further, a plurality of lists of beacons may be selected. In some embodiments, the estimated location is then set to be the location associated with the selected or matched beacon list from the post information 308. In other embodiments, the estimated location is determined or computed via a mathematical function based on the locations associated with the matched lists of beacons.

In other embodiments, the received location information is compared with the maintained post information 308 by triangulation. In such embodiments, the post information 308 is analyzed to define a location for each of the beacons stored as part of the post information 308. For example, triangulation is performed for each beacon in the beacon lists in the post information 308 to determine the approximate location of each beacon. Alternatively, another source may be accessed to determine known locations of the beacons in the post information 308. The post information 308 is then searched using the list of wireless network access beacons to determine if any of the beacons in the list are in the post information 308. If so, the approximate locations of one or more of the beacons in the list are retrieved. Using these approximate locations, the estimated device location for the requesting computing device is determined (e.g., by triangulation or other means).

The estimated device location is compared to the actual device location at 408. A difference between the estimated device location and the actual device location is determined at 410. The determined difference represents a confidence score, relevancy factor, or the like. Based on the determined difference, the post information 308, or methods for processing such information, is modified at 412.

For example, the locations 310 associated with the beacon lists in the post information 308 may be modified based on the accuracy assessment or other data obtained during or derived from performance of the accuracy assessment. In another example, the methods for processing the post information 308 may be adjusted to improve the accuracy of future location estimations. Alternatively or in addition, the accuracy assessments may be used to aid in making business decisions regarding deployment of location-based services in selected geographic areas. For example, developers may be less inclined to target areas where location estimations are grossly inaccurate, and instead focus deployment on areas where the accuracy is better. To this end, the accuracy assessments may be used to generate accuracy maps such as illustrated in FIG. 6.

In some embodiments, one or more computer-executable components execute on the mobile computing device 102 or other computing device to assess the accuracy of the location estimation systems. For example, the components from FIG. 3 execute to perform the operations illustrated in FIG. 4. The interface component 314 receives, from a computing device such as a user computing device, location information including a device location associated with the computing device. The location information further identifies one or more wireless network beacons accessible by the computing device at the device location. The memory component 316 maintains the post information 308 including a plurality of locations 310 each having the list of wireless network beacons 312 accessible therefrom. In some embodiments, the post service 104 executes the memory component 316. The estimator component 318 defines a location for each of the identified wireless network beacons based at least on the post information 308 maintained by the memory component 316. The estimator component 318 further determines an estimated device location based on the defined locations 310. In some embodiments, the query service 210 executes the estimator component 318. The analytic component 320 compares the estimated device location with the received device location to determine a difference between the estimated device location and the received device location. In some embodiments, the analytic component 320 ranks the plurality of location based on the determined difference. For example, the analytic component 320 includes the analytics engine 212 and/or one or more performance counters. The feedback component 322 modifies the maintained post information 308 based on the determined difference.

Figure 5:
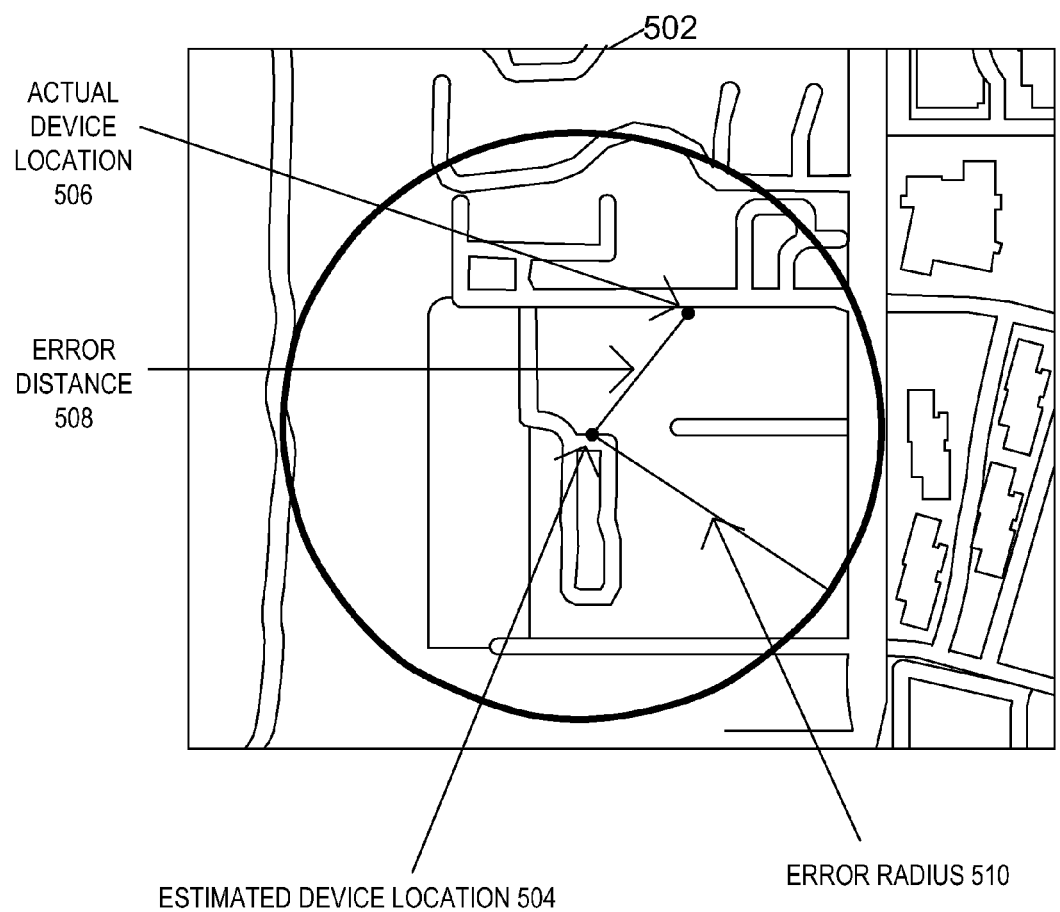
FIG. 5 is an exemplary user interface displaying an error distance and an error radius when calculating the estimated device location.

Referring next to FIG. 5, an exemplary user interface 502 displays an error distance 508 and an error radius 510 when calculating the estimated device location 504. The user interface 502 may be displayed on any computing device. In the example of FIG. 5, the error distance 508 is defined to be the distance between the estimated device location 504 and the actual device location 506. The error radius 510 is defined to be a predicted accuracy estimation, or a range within which the computing device may be. In this example, the error distance 508 is less than the error radius 510, indicating that the estimated device location 504 has accuracy better than the predicted accuracy. The predicted accuracy may include, for example, an average, median, or other statistical calculation for representing the accuracy over a period of time.

Figure 6:
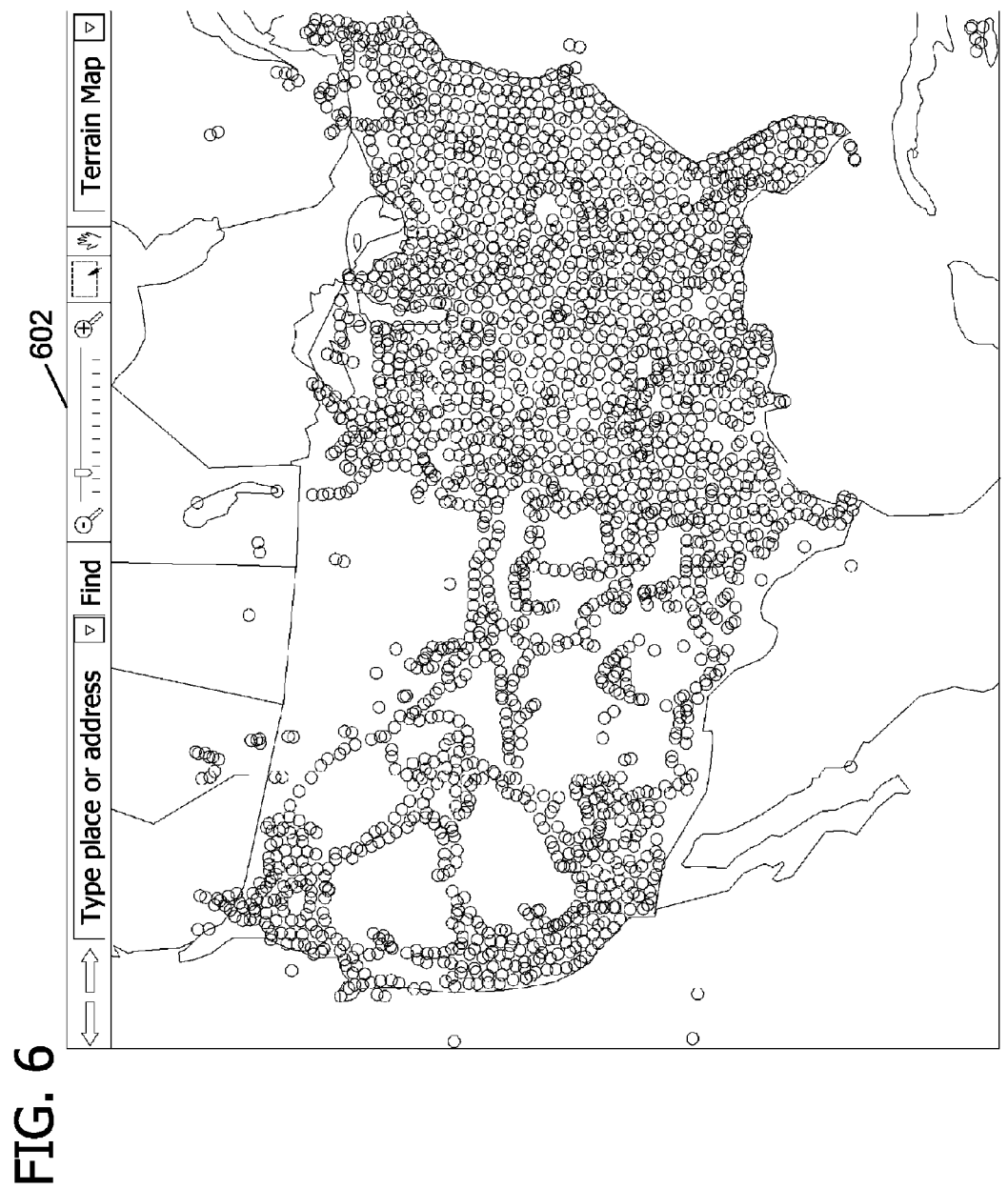
FIG. 6 is an exemplary user interface displaying an accuracy map.

Referring next to FIG. 6, an exemplary user interface 602 displays an accuracy map. The exemplary accuracy map in FIG. 6 is generated based on the output of the analytics engine 212. The output includes, as described herein, various statistics and other analysis of the difference between the estimated device location and the known location for one of the mobile computing devices 102. The output is quantified and represented on the accuracy map.

The pushpins in FIG. 6 represent areas where the accuracy of location estimation system has been evaluated and deemed acceptable. That is, the accuracy meets or exceeds a pre-defined threshold value. Viewers of the accuracy map can identify the areas where accuracy is acceptable, and focus deployment or development activities in those areas. Viewers may also identify accuracy trends across the geographic area.

EXAMPLES

An example of a call from an application program to the post service 104 to provide crowd-sourced data 204 or war driving data 206 is shown below. The post information 308 in this example includes the ground truth location of the computing device executing the application program along with a list of the accessible wireless network beacons.

```
<GroundTruthLocation>
    <Latitude>47.6450</Latitude>
    <Longitude>-122.1410</Longitude>
</GroundTruthLocation>
<CellTower>
    <CellTowerId>16911</CellTowerId>
    <CountryCode>310</CountryCode>
    <LocationAreaCode>42994</LocationAreaCode>
    <OperatorId>415</OperatorId>
</CellTower>
<WifiAccessPoint>
    <Bssid>00:0b:86:C7:24:61</Bssid>
    <Ssid>CORPWLAN</Ssid>
</WifiAccessPoint>
<WifiAccessPoint>
    <Bssid>00:0b:86:C7:21:E2</Bssid>
    <Ssid>A-CORPWLAN</Ssid>
</WifiAccessPoint>
<WifiAccessPoint>
    <Bssid>00:0b:86:CF:06:60</Bssid>
    <Ssid>CORPGUEST</Ssid>
</WifiAccessPoint>
```

An example of a request sent from the post service 104 to the query service 210 is shown below. The request includes the list of wireless network beacons visible by the requesting computing device.

```
<CellTower>
    <CellTowerId>16911</CellTowerId>
    <CountryCode>310</CountryCode>
    <LocationAreaCode>42994</LocationAreaCode>
    <OperatorId>415</OperatorId>
</CellTower>
<WifiAccessPoint>
    <Bssid>00:0b:86:C7:24:61</Bssid>
    <Ssid>CORPWLAN</Ssid>
</WifiAccessPoint>
<WifiAccessPoint>
    <Bssid>00:0b:86:C7:21:E2</Bssid>
    <Ssid>A-CORPWLAN</Ssid>
</WifiAccessPoint>
<WifiAccessPoint>
    <Bssid>00:0b:86:CF:06:60</Bssid>
    <Ssid>CORPGUEST</Ssid>
</WifiAccessPoint>
```

An example of a response from the query service 210 is shown below. The response includes the estimated location of the computing device.

```
<EstimatedLocation>
    <Latitude>47.64262</Latitude>
    <Longitude>-122.1423633</Longitude>
    <Radius>1300</Radius>
</EstimatedLocation>
```

An example of the data sent from the post service 104 for analytics is shown below. The data includes both the ground truth location (e.g., the actual, known location of the computing device) and the estimated location of the computing device. The data is then analyzed as described herein.

```
<GroundTruthLocation>
    <Latitude>47.6450</Latitude>
    <Longitude>-122.1410</Longitude>
</GroundTruthLocation>
<EstimatedLocation>
    <Latitude>47.64262</Latitude>
    <Longitude>-122.1423633</Longitude>
    <Radius>1300</Radius>
</EstimatedLocation>
```

Example instructions or code for performing a cross query is shown below.

```
CrossQuery(PostRequest)

If(PostRequest contains valid Latitude and Longitude &&
    PostRequest contains list of beacons)
  Then
    Get ground truth location(gtLocation) from
      PostRequest
    Get List of beacons (bList) from PostRequest
    Call QueryService with Beacon List and receive
      estimated Location (eLocation)
    If(eLocation has valid latitude and longitude)
      Then
        RequestSuccess = True
        Compute distance between gtLocation and eLocation
          as Error Distance using Haversine
        If(Error Distance < error radius in eLocation)
          Then
            RequestHit = True
          Else
            RequestHit = False
        EndIf
      Else
        RequestSuccess = False
    EndIf
Endif
```

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for using crowd-sourced data 204 to determine the accuracy of the location estimation system, and exemplary means for obtaining the post information 308.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for assessing the accuracy of a location estimation system, said system comprising:
   a memory area for storing post information including a plurality of locations each having a list of wireless network beacons accessible therefrom; and
   a processor programmed to:
      receive, from a mobile computing device, location information comprising a known device location associated with the mobile computing device, said location information further identifying one or more wireless network beacons accessible by the mobile computing device at the known device location;
      search the post information stored in the memory area based on the identified wireless network beacons to identify one or more of the plurality of locations, the one or more of the plurality of locations being identified by comparing the received location information with the lists of wireless network beacons in the stored post information;
      determine a location for the mobile computing device based on the identified one or more of the plurality of locations;
      compare the determined location with the received known device location;
      determine a difference between the determined location and the received known device location based on said comparing; and
      modify the post information in the memory area as a function of the determined difference.

2. The system of claim 1, wherein the processor is further programmed to store the received known location information in the memory area as part of the post information.

3. The system of claim 1, wherein the processor is further programmed to:
   quantify the determined difference; and
   generate an accuracy map having represented thereon the quantified difference associated with the received known device location, the accuracy map being used in deciding deployment of location-based services at the received known device location.

4. The system of claim 1, further comprising means for using crowd-sourced data to determine the accuracy of the location estimation system.

5. The system of claim 1, further comprising means for obtaining the post information.

6. A method comprising:
   receiving, from a computing device, location information comprising a device location associated with the computing device, said location information further identifying one or more wireless network beacons accessible by the computing device at the device location;
   maintaining post information including a plurality of locations each having a list of wireless network beacons accessible therefrom;
   comparing the received location information with the maintained post information to determine an estimated device location by comparing the identified wireless network beacons with the lists of wireless network beacons to determine the estimated device location;
   comparing the estimated device location with the received device location;
   determining a difference between the estimated device location and the received device location based on said comparing the estimated device location with the received device location; and
   modifying said maintained post information based on said determined difference, the modifying comprising modifying one or more of the plurality of locations included in the maintained post information.

7. The method of claim 6, further comprising generating an accuracy map having represented thereon the determined difference associated with the received device location.

8. The method of claim 6, wherein receiving the location information comprises receiving one or more of the following: crowd-sourced data and war driving data.

9. The method of claim 6, wherein the estimated device location is determined from a matched beacon list from the post information, the matched beacon list comprising data related to a pre-defined threshold quantity of beacons.

10. The method of claim 6, wherein comparing the received location information with the maintained post information comprises:
   defining a location for each of the identified wireless network beacons based at least on the maintained post information; and
   determining the estimated device location based on the defined locations.

11. The method of claim 10, wherein determining the estimated device location comprises triangulating the estimated device location based on the defined locations.

12. The method of claim 6, wherein determining the difference comprises defining an error distance between the received device location and the estimated device location.

13. The method of claim 6, further comprising defining an average accuracy radius for the received device location based on the maintained post information.

14. The method of claim 6, wherein receiving the location information comprises receiving a list of one or more wireless network beacons comprising one or more of the following: a cellular network tower, a router, a wireless access point, and a network access point.

15. One or more computer memories storing computer-executable components, said components comprising:
- an interface component that when executed by at least one processor causes the at least one processor to receive, from a computing device, location information comprising a device location associated with the computing device, said location information further identifying one or more wireless network beacons accessible by the computing device at the device location;
- a memory component that when executed by at least one processor causes the at least one processor to maintain post information including a plurality of locations each having a list of wireless network beacons accessible therefrom;
- an estimator component that when executed by at least one processor causes the at least one processor to define a location for each of the identified wireless network beacons based at least on the post information maintained by the memory component, said estimator component further determining an estimated device location based on the defined locations by comparing the identified wireless network beacons with the lists of wireless network beacons to determine the estimated device location;
- an analytic component for comparing the estimated device location with the received device location to determine a difference between the estimated device location and the received device location; and
- a feedback component for modifying said maintained post information based on said determined difference.

16. The computer memories of claim 15, wherein the memory component includes a post service.

17. The computer memories of claim 15, wherein the estimator component includes a query service.

18. The computer memories of claim 15, wherein the analytic component includes one or more performance counters.

19. The computer memories of claim 15, wherein the interface component receives the location information from a plurality of mobile computing devices, wherein the location information represents crowd-sourced data.

20. The computer memories of claim 15, wherein the analytic component ranks the plurality of locations based on said determined difference.

* * * * *